UNITED STATES PATENT OFFICE 2,251,618

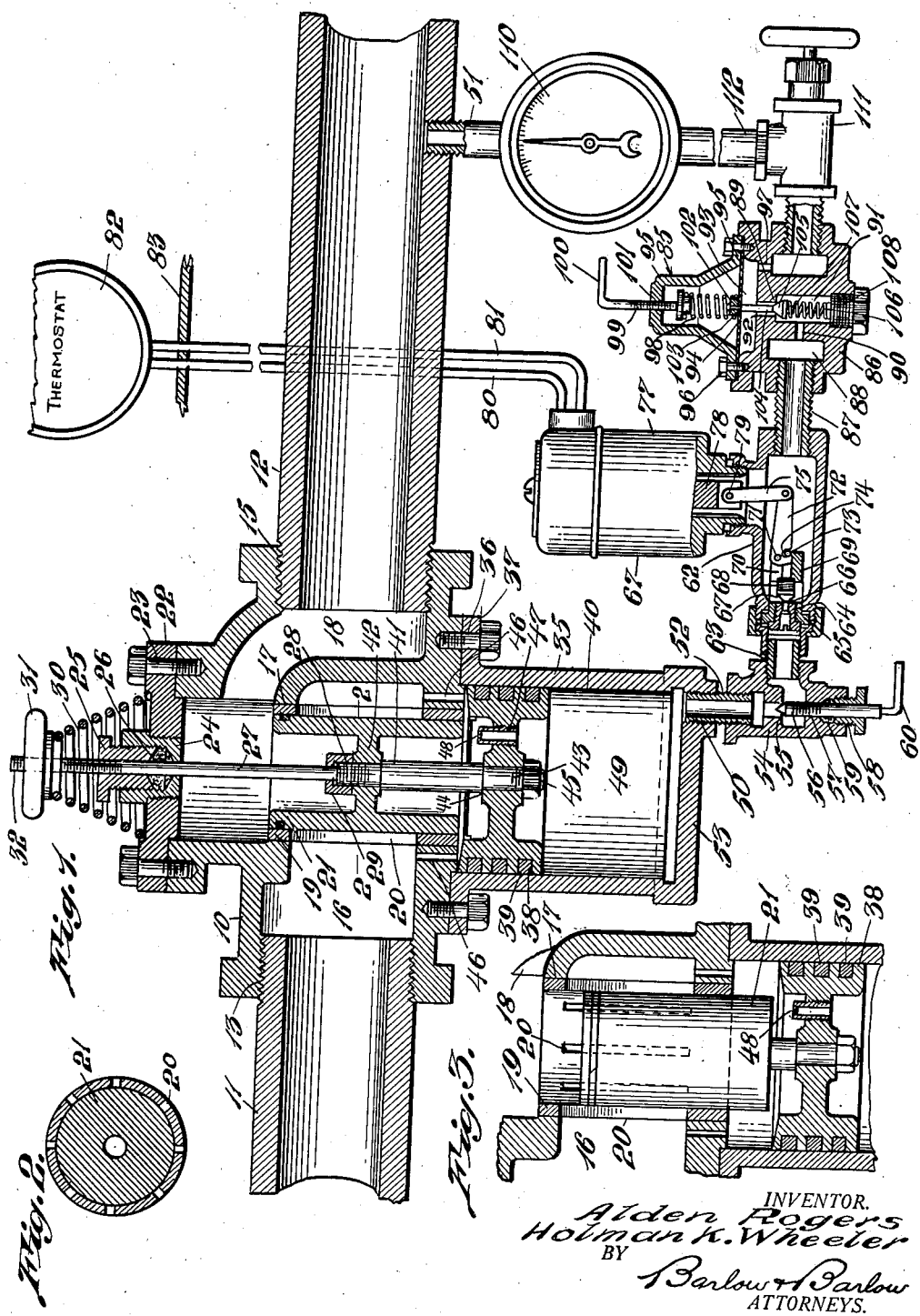

SLOW OPENING VALVE

Alden Rogers and Holman K. Wheeler, Providence, R. I.

Application September 1, 1938, Serial No. 227,922

5 Claims. (Cl. 137—139)

This invention relates to a valve structure whereby the opening of the valve may be gradual to permit a slowly increasing flow of fluid from one side to the other; and has for one of its objects to provide in such a valve the control entirely by the pressures of the fluid which the valve controls on the valve and without using any so-called motorized control for the operation of the valve.

Another object of the invention is to provide in such a valve an adjustment for furnishing any pressures desired on the low pressure side of the flow line in which the valve is positioned.

Another object of the invention is to provide an adjustment whereby the speed of opening of the valve may be nicely controlled and such as will operate on any usual pressures encountered.

Another more specific object of the invention is to provide a differential of pressures on a piston for operating the valve as distinct from any motorized control thereof.

Another object of the invention is to provide in a structure of this character a valve which will be smooth acting rather than one in which there will be an opening and closing of the parts with a consequent periodic flow and cessation and consequent intermittent action which may produce vibration.

With these and other objects in view, the invention consists of certain novel features of construction, as will be more fully described, and particularly pointed out in the appended claims.

Fig. 1 is a sectional view of the valve with parts largely diagrammatically shown as connected therewith and illustrating the arrangement of the structure provided;

Fig. 2 is a sectional view on substantially line 2—2 of Fig. 1;

Fig. 3 is a fragmental sectional view illustrating the piston in partially lowered position and exposing the ports in the sleeve which surrounds the piston.

Slow opening valves are usually in some way connected with some motor part which causes their actuation, and in such valves as we are acquainted with the flow openings are usually in the piston which does not afford as even and nice a control as is at times desired. Some of these valves are actuated by diaphragms which do not afford the desired amount of movement; and to avoid these various objections and limitations in a valve of this character, we have arranged a piston operated valve which is operated entirely by the pressure in the system which it controls without dependence upon any motorized part for actuation of the valve, the valve affording the desired movement for the operation desired, and instead of placing openings in the valve for passage therethrough of the fluid we have arranged a sleeve about the valve which is provided with these openings with the valve solid so that a much slower opening valve may be provided; and the following is a more detailed description of the present embodiment of this invention, illustrating the preferred means by which these advantageous results may be accomplished:

With reference to the drawing, the valve body structure is designated 10 and is included between the high pressure or inlet flow line 11 and the low pressure or outlet flow line 12 of the system which it is to control. The higher pressure side of the valve may for example be in the neighborhood of 100 pounds pressure in the inlet flow line 11 whereas we would desire, for instance 10 pounds pressure, in the outlet flow line 12. These flow lines 11 and 12 have suitable conduits screwed into fittings 13 and 15 in the valve body, as clearly illustrated.

The valve body has a hollow central portion 16 connecting with the inlet passage, a flow passage 17 and outlet passage 18 connecting with the outlet conduit 12. A cylindrical sleeve 19 is located in the flow passage 17 and extends across the hollow body 16 and is provided with a plurality of slots or slits 20, such for instance as eight in number, extending lengthwise of the cylinder 19 and for the length equal to the hollow portion 16 of the valve body. The hollow portion of the body 16 extends completely around the sleeve and its slots so that it is exposed to the same pressure on all sides. A valve 21 is slidable within the sleeve 19 axially thereof and when in the position shown in Fig. 1 will close the slots 20 and consequently the flow passage 17, while when moved downwardly, as shown in Fig. 3, the slots 20 will be partially exposed to permit a flow from the body 16 through the slots and through the passages 17 and 18.

A cap 22 held in position on the valve body by bolts 23 closes the upper end of the valve body structure and is provided with packing gland members 24 and 25 between which there is located packing 26 for preventing escape of fluid about the rod 27 which slides therethrough and is secured to the valve 21 as at 28 by binding nut 29 and which extends through this cap 22 and is urged upwardly by the spring 30 engaging the cap 22 and the adjustable wheel member 31 having threaded engagement as at 32 with this rod 27. Thus, normally the valve under the action of spring 30 is moved to its closed position as shown in Fig. 1.

Depending from the valve body 10 is a cylindrical casing 35 which is bolted to the valve body by the bolts 36 extending through the flange 37 thereof. This cylinder contains a piston 38 having suitable piston rings 39 engaging the inner surface 40 of the cylinder 35 and slidable therealong and maintains a tight fit therewith. This piston has the piston rod portion 41 which may be one piece with the rod portion 27 secured to the web portion 42 of the valve such as by reason of the rod 41 being reduced to provide a shoulder and extending through the web 42 to be there bound in position by the nut 29 while at its lower end the reduced portion 43 forming the shoulder 44 extends through a central opening in the piston and is locked against the shoulder 44 by the nut 45.

The cylinder casing 35 has communication with the hollow body of the valve 16 by means of a plurality of openings 46 so that any pressure which exists in the inlet conduits 11 and hollow valve body 16 will be transmitted to the upper side of the piston and as this piston has an area greater than the area exposed of the valve to which it is connected the pressure will tend to force the piston downwardly in the casing. A nipple 47 is inserted in the piston and has a small bleeder opening 48 so that the pressure which is existent above the piston will be transmitted slowly to the cylindrical chamber 49 below the piston, and when the pressure below and above are equal the piston will be moved to close the valve by the spring 31.

The chamber 49 has a control opening 50 extending therefrom which is a part of a conduit extending from this chamber 49 back to the outlet conduit 12 at the connection 51. A threaded sleeve 52 is screwed into the lower wall 53 of cylinder 35 which connects the needle valve 53 in depending relation thereto. This valve provides a valve seat 55 which is engaged by a threaded needle valve 56 having a conical end which by reason of its threaded engagement 57 can be moved toward and from the seat 55 to vary the opening therethrough. Packing gland 58 with packing 59 about the needle valve 56 forms a tight connection to prevent escape of the fluid which may pass through the valve. A right angularly extending portion 60 of the valve provides a handle for its adjustment or control of the opening through the seat 55.

In the conduit from the chamber 49 to the outlet passage at 51 there occurs a solenoid controlled valve 61 which is either fully open or fully closed and which comprises the hollow body portion 62 which is suitably connected with the valve 54 by a threaded conduit 63. A valve seat 64 is threaded into a sleeve 65 in the body and provides a valve seat 66 for engagement by the conical valve 67 in the back of which there is a spring 68 to force the valve to closed position. This valve is slidable in member 69 which is slotted as at 70 and provided with a pin 71 upon which a lever 72 is mounted which has a slot 74 to receive the pin 73 on the valve stem so that as this lever is lifted through the link 75 the valve is withdrawn from its seat. An electrical coil is provided within the casing 77 so that when energized, as when contact is made by dropping of the temperature in the room, the solenoid core 78 connected as at 79 to the link 75 will draw the link upwardly and swing the lever 72. This solenoid coil is connected as by means of electrical conduits 80 and 81 to a room thermostat 82 above the floor 83 in some remote location which may cause opening upon dropping of the temperature or closing upon rising of the temperature of the valve in response to room conditions. Although we have illustrated the valve as open when the solenoid is energized the reverse arrangement may in some cases be desirable so that when the temperature has dropped the circuit will be broken and the valve will then at such time be opened. A different pivoted relation will in such case be had.

An automatic pressure actuated valve is illustrated generally at 85, although an electrical valve may be here used. The valve shown consists of a casing 86 which has connection through the threaded member 87 with the solenoid body 62 just previously referred to so as to deliver the fluid to the hollow portion 88 of this control device. A valve seat 89 is provided in this cast structure to control the passageway 90, 91, 92 to the chamber 93 below the diaphragm 94 which is mounted between the body 86 and the cap portion 95 of the casing by means of bolts 96. A discharge opening 97 extends from the chamber 93 and a spring 98 applies a certain amount of pressure governed by the threaded member 99 with handle 100 and rotatable in the threaded opening 101 in the cap 95 so as to maintain a certain pressure upon the diaphragm 94. This spring is guided in its engagement with the diaphragm by a boss 102 suitably secured thereon by the reduced headed over end 103 of the stem 104 of the valve 105 having a conical surface to engage the valve seat 89 and urged upwardly by spring 106 which is of less strength than the spring 98 which is guided by a pin 107 on the valve 105. This spring abuts the threaded plug 108 in the lower portion of the casing 86. When the pressure existent in the chamber 93 is greater than a predetermined set amount the valve will close to prevent further flow until this pressure drops to a certain amount when it will again open to permit a flow therethrough.

The flow line from the chamber 49 to the outlet conduit 12 is completed through the fitting 111 and conduit 112 which has an indicator 110 located in the line.

By reason of the apparatus which we have provided the pressure existent in the system provides all the power for operating the valves for the maintenance of the pressure in the low side at a certain predetermined amount, no spring or electric motor device being required. It will also be readily apparent that we may change the sleeve 19 for a similar one but having different sized ports 20 so that a different control action as to speed of opening the valve may be had, and it will also be readily apparent that by reason of the pressure surrounding the sleeve and being admitted to the valve 21 through a plurality of oppositely disposed ports that no pressure is exerted upon the valve so that the actuation of the valve is balanced at all times by this high pressure.

Supposing that there be 100 pounds pressure in the conduit 11 and it is desired that there be 10 pounds pressure maintained in the conduit 12. We will assume that the full line position of the valve shown in Fig. 1 exists and that there is also 100 pounds pressure in the chamber 49 which has been built up by the bleeding of the pressure from above the piston to below the piston by reason of the closure of one of the valves in the conduits which extend from the chamber 49 to the conduit 12. Next assuming that the pressure of the conduit 12 has dropped below the amount of 10 pounds and that a cooling is occurring below the setting of the thermostat 82 so that this thermostat is operating the solenoid to open the valve 67. The valve 89 is also opened by reason of the drop of pressure in the conduit 12. Therefore, a flow of fluid from the chamber 49 where it previously was 100 pounds is commenced, and this flow will be greater than can the amount of fluid supplied through the bleeder 48 in the piston to the chamber 49. Therefore, the pressure decreases below the piston and the piston is forced downwardly which causes a slow opening of the valve by a commencing of uncovering of the ports as shown in Fig. 3. This slow opening continues until the pressure in the conduit 12 assumes the predetermined 10 pounds pressure desired. The slow escape through the needle valve 56 assures a slow operation of the piston downwardly. Should the pressure in the conduit 12 be built up greater than to a predetermined amount, such for instance as 10 pounds, the device 85 by reason of its diaphragm will cause the valve 105 to shut off and check the flow through the conduit, whereupon pressure will again build up in the chamber 49 and the valve will be closed. Should the temperature at the location 82 be built up prior to the building up of the desired pressure in the line 12, then the thermostat will cause a closure of the solenoid valve and pressure would again begin to build up in the chamber 49 and slowly close the valve. The action from either closing to opening or opening to closing will be very slow in either case, as will be readily apparent.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. In a device of the character described, a conduit flow line, a valve body in said flow line, valve means in said body for controlling the amount of flow through said flow line, and valve control means comprising a pressure operated movable member secured to said valve means and spaced therefrom and with the side next to the valve means exposed to the high pressure side of said flow line, a bleeder extending from said exposed side through said member, and a conduit from the opposite side of said member and supplied through said bleeder and having therein a power controlled valve for opening or closing said conduit, and an adjustable valve between said power controlled valve and bleeder to regulate the flow of the bled fluid therethrough and thus control the opening of said valve.

2. In a device of the character described, a conduit flow line, a valve body in said flow line, valve means in said body for controlling the amount of flow through said flow line, and valve control means comprising a pressure operated movable piston extending from said valve means and with the end surface adjacent said valve means exposed at all times to the high pressure side of said flow line, a bleeder through said piston, and a conduit from the opposite side of said piston and supplied through said bleeder and having therein a solenoid controlled valve for opening or closing said conduit and an adjustable valve in said conduit to regulate the flow of the bled fluid therethrough and thus control the opening of said valve.

3. In a device of the character described comprising a conduit flow line, a valve body in said flow line, valve means in said body for controlling the flow through said flow line, and valve control means comprising a pressure operated movable member spaced from said valve means and with the side next to said valve means exposed to the high pressure side of said flow line, a bleeder extending from the said exposed side through said member, and a conduit from the opposite side of said member to the low pressure side of said flow line and supplied through said bleeder and having therein a power controlled valve for opening or closing said conduit and an adjustable valve in said conduit to regulate the flow of the bled fluid therethrough and thus control the opening of said valve, and a pressure control valve also in said circuit.

4. In a device of the character described comprising a conduit flow line, a valve body in said flow line, means in the body for controlling the flow therethrough comprising a piston part and a sleeve part with a plurality of slots extending lengthwise of the sleeve and uncovered by the piston as relative movement occurs, and an element secured to one of said parts and extending beyond said valve body, and having an abutment thereon, and resilient means acting between said abutment and valve body for applying a yielding resistance force to the relative opening movement of said parts, and a second piston extending from said first mentioned piston movable therewith and having a surface exposed to the fluid and moved thereby to move said piston in a direction to uncover said slots.

5. In a device of the character described comprising a conduit flow line having a high pressure flow conduit and a relatively lower pressure flow conduit, a valve body connecting said flow conduits and having fluid passageways therein for the flow of fluid from one conduit to the other, valve means in said body movable to close said passageways to control the flow of fluid therethrough, and valve control means comprising a pressure operated movable member exposed to the high pressure side of said flow line and provided with a bleeder extending therethrough, a conduit from the opposite side of said member to the low pressure conduit and supplied through said bleeder, a power-controlled valve for opening or closing said conduit and a pressure control valve in said conduit exposed to the lower pressure side of said flow conduit and arranged to control the outflow of fluid passing through said bleeder.

ALDEN ROGERS.
HOLMAN K. WHEELER.